US008830867B2

(12) United States Patent
Lu et al.

(10) Patent No.: US 8,830,867 B2
(45) Date of Patent: Sep. 9, 2014

(54) METHODS AND NETWORK ELEMENTS OPERABLE TO SPECIFY AND DETERMINE COMPLETE SETS OF LINK STATE MESSAGES FOR LINK STATE ROUTING PROTOCOLS

(75) Inventors: Wenhu Lu, San Jose, CA (US); Albert J. Tian, Cupertino, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 340 days.

(21) Appl. No.: 13/277,100

(22) Filed: Oct. 19, 2011

(65) Prior Publication Data

US 2013/0021943 A1     Jan. 24, 2013

Related U.S. Application Data

(60) Provisional application No. 61/510,175, filed on Jul. 21, 2011.

(51) Int. Cl.
*H04L 12/28* (2006.01)
*H04L 12/757* (2013.01)

(52) U.S. Cl.
CPC ................................. *H04L 45/023* (2013.01)
USPC ........................................................ 370/254

(58) Field of Classification Search
USPC ................................................. 370/254, 255
See application file for complete search history.

(56) References Cited

U.S. PATENT DOCUMENTS

| | | | |
|---|---|---|---|
| 2003/0210710 A1 | 11/2003 | Odman | |
| 2006/0245372 A1 | 11/2006 | Ou et al. | |
| 2007/0286091 A1 | 12/2007 | Hopps et al. | |
| 2011/0228785 A1* | 9/2011 | Filsfils et al. | 370/395.31 |

OTHER PUBLICATIONS

PCT The Written Opinion, Telefonaktiebolaget L M Ericsson (PUB), Oct. 16, 2012.
Pierre Francois Oliver Bonaventure Universite Catholique De Louvaun Mike Shand Stewart Bryant Stefano Pevidi Clarence Filsfils C: "Loop-free convergence using oFIB; draft-ierf-rtgwg-ordered-fib-03.txt", Loop-Free Convergence Using oFIB; Draft-ietf-rtgwg-ordered-fib-03.txt, Internet Engineering Task Force, IETF; Standardworkingdraft, Internet Society (ISOC) 4, Rue Des Falaises CH-1205 Geneva, Switzerland, No. 3, Mar. 5, 2010, pp. 1-18, XP015067705, [retrieved on Mar. 5, 2010] sections 2, 4.1, 4.2, 6 and 6.2.

(Continued)

*Primary Examiner* — Man Phan
*Assistant Examiner* — Kevin Lee
(74) *Attorney, Agent, or Firm* — Blakely, Sokoloff, Taylor & Zafman

(57) ABSTRACT

A method, performed by a transmitter network element utilizing a link state routing protocol which has a maximum link state message size. The method is for providing information to avoid a disruption in data forwarding that would result from a receiver network element performing preferred route computations based on an incomplete set of link state messages. The method includes generating a complete set of link state messages having information indicating that the link state messages are the complete set of the link state messages. The complete set of the link state messages are collectively coherent with a link state of the transmitter network element. The method also includes transmitting the complete set of the link state messages, and the information indicating that the link state messages are the complete set of the link state messages, to a network. Also disclosed are transmitter network elements, receiver network elements, and methods thereof.

21 Claims, 13 Drawing Sheets

(56) References Cited

OTHER PUBLICATIONS

Hermelin Montilo Inc S Previdi M Shand CISCO Systems A: "Extending the Number of Intermediate System to Intermediate System (IS-IS) Link State PDU (LSP) Fragments Beyond the 256 Limit; rfc3786.txt", May 1, 2004, XP015009566, ISSN:0000-0003 sections 1, 1.4, 2, 3.1, 3.1.1, 3.1.2, 4 and 5.

Fred Goldstein: "The Radio Shortest Path First (RSPF) Routing Protocol Specification—IV. Link state propagation", Nov. 22, 2000, pp. 1-10, XP055066703, Retrieved from the Internet: URL:http://rspf.sourceforge.net/rspfspec4.html [retrieved on Jun. 14, 2013].

PCT Search Report, Written Opinion, PCT/IB2012/053664, Jul. 18, 2012 Telefonaktiebolaget LM Ericsson (Publ) pp. 7.

D. Oran, "RFC 1142 OSI IS-IS Intra-Domain Routing Protocol" Digital Equipment Corp. Feb. 1990, http://www.faqs.org/rfcs/rfc1142.html., Oct. 19, 2011.

R. Callon, "RFC 1195—Use of OSI IS-IS for Routing in TCP/IP and Dual Envir", Digital Equipment Corp. Dec. 1990, http://www.faqs.org/rfcs/rfc1195.html., Oct. 19, 2011.

T. Li, "RFC 5305 IS-IS Extensions for Traffic Engineering", Redback Networks, Inc., Oct. 2008, http://www.faqs.org/rfcs/rfc5305.html., Oct. 19, 2011.

International Standard ISO/IEC 10589, Second Addition Nov. 15, 2002, "Information Technology Telecommunications and Information Exchange Between Systems-Intermediate System to Intermediate System . . . " Reference No. ISO/IEC 10589:2002 (E), ISO copyright office, www.iso.org, Published in Switzerland.

Pierre Francois et al., "Loop-free convergence using oFIB draft-ietf-rtgwg-ordered-fib-03," Mar. 5, 2010, 18 pages, Network Working Group, Internet Draft, IETF.

A. Hermelin et al., "Extending the Number of Intermediate System to Intermediate System (IS-IS) Link State PDU (LSP) Fragments Beyond the 256 Limit," May 2004, 14 pages, Network Working Group, Request for Comments: 3786, The Internet Society.

* cited by examiner

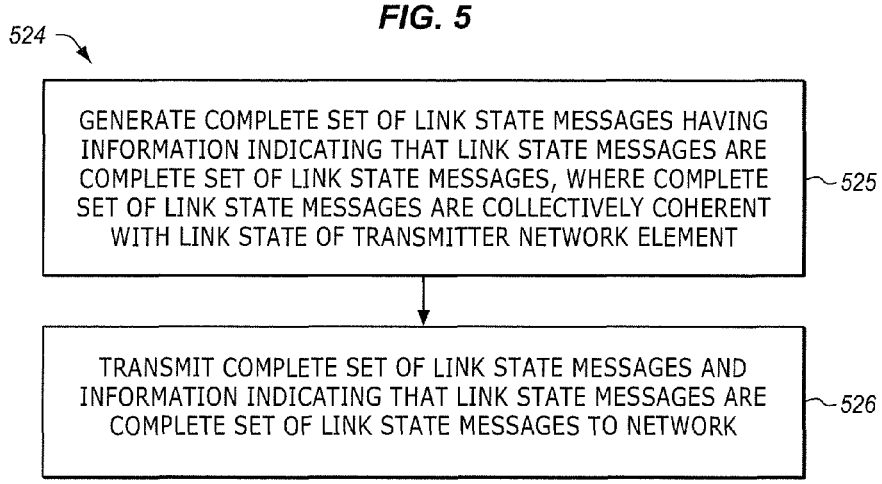
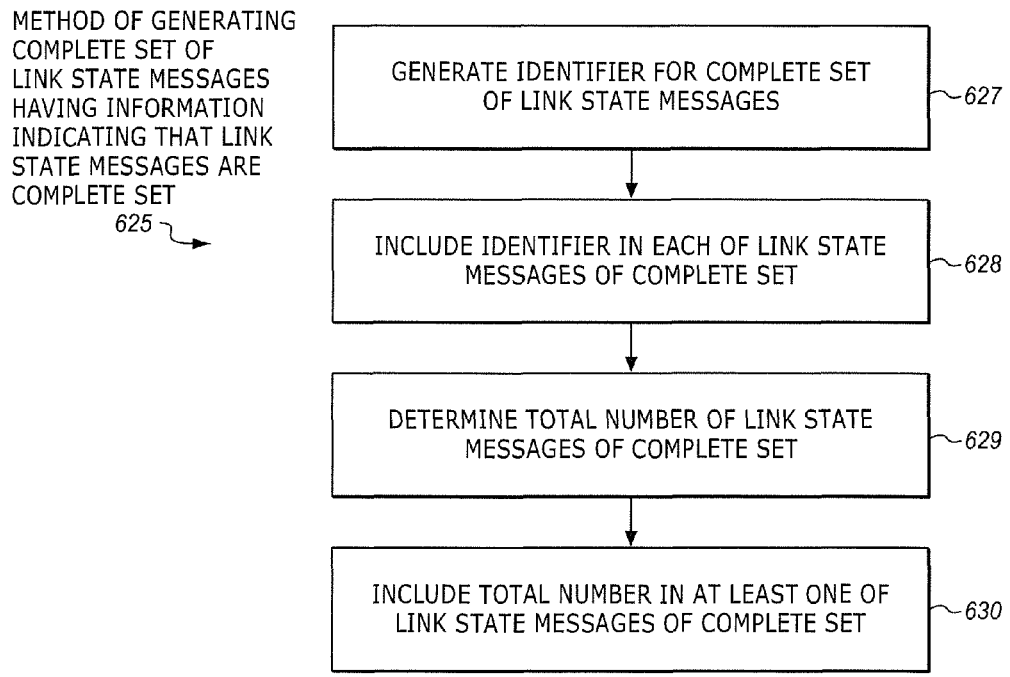

METHODS AND NETWORK ELEMENTS OPERABLE TO SPECIFY AND DETERMINE COMPLETE SETS OF LINK STATE MESSAGES FOR LINK STATE ROUTING PROTOCOLS

CROSS REFERENCE TO RELATED APPLICATIONS

This application claims the benefit of U.S. Provisional Application No. 61/510,175 filed Jul. 21, 2011, which is hereby incorporated by reference.

FIELD

Embodiments of the invention relate to the field of networking; and more specifically, to link state routing protocols.

BACKGROUND

Intermediate System To Intermediate System (IS-IS) is a link state routing protocol that is described in ISO 10589, Second Edition, which was published on 2002 Nov. 15, and republished in RFC 1142. The IS-IS protocol natively operates at the Open Systems Interconnection (OSI) model network layer. IS-IS is an interior gateway protocol typically used for routing within an administrative domain or network, as opposed to an exterior gateway protocol typically used for routing between autonomous systems.

According to IS-IS, each IS-IS router is to operate as an originating router and is to transmit link state advertisements having state information throughout the IS-IS network of routers. Commonly, the link state advertisements may be Link State Protocol Data Units (LSPs) having Type-Length-Value (TLV) elements that each includes link state information. Each LSP may identify the originating router that generated it and may identify all the other routers to which the originating router is directly connected. Each receiving IS-IS router is to use the link state information to build and maintain a database representing the connectivity of the network (e.g., a link state database), and is to forward a copy of the link state advertisements to each of their respective neighboring routers. Each of the receiving routers is also to calculate and store a shortest path to each of the destinations (e.g., in a routing table). The routers may use these shortest paths to route or forward data or traffic (e.g., packets or datagrams).

FIG. 1 is a block diagram of an example IS-IS network 100. The network includes an originating IS-IS router 101 and a receiving IS-IS router 107. The originating IS-IS router has an IS-IS routing protocol module 102 that includes a route distribution module 103. The originating IS-IS router also has a routing information base 104. Periodically, when connectivity changes occur, etc., the route distribution module 103 may access the routing information base 104 and distribute link state advertisements (e.g., LSPs) to the receiving IS-IS router 107. As shown, an LSP 106 having a TLV-A element 114A and a TLV-B element 114B may be transmitted to the receiving IS-IS router over a link 105. Each of the TLV-A and TLV-B elements may include link state information. The receiving IS-IS router has an IS-IS routing protocol module 108 that includes a shortest path first (SPF) computation module 109 and a routing information base update module 110. The receiving IS-IS router also has a routing information base 111, which includes a link state database 113 and a routing table 112. When the LSP 106 is received, the routing information base update module may store link state or connectivity represented in the LSP in the link state database. The shortest path computation module may compute a shortest path based on the link state or connectivity. The routing information base update module may store the computed shortest paths in the routing table.

Periodically, when connectivity changes occur, etc., the originating router 101 is to transmit a refresh or update link state advertisement (e.g., an LSP). According to IS-IS each link state advertisement or LSP is to include a sequence number. The originating router is to increase the sequence number each time a newer version of the link state advertisement or LSP is generated. The receiving router is to preserve the highest sequence number received. When the receiving router receives the refresh or update LSP it is to look up the preserved highest previously received sequence number. If the sequence number of the refresh or update LSP is greater than the preserved sequence number, then the refresh or update LSP is considered newer and relevant. Then, the receiving router is to use the refresh or update LSP to refresh or update the database representing the connectivity of the network (e.g., the link state database). Moreover, the refreshed or updated connectivity is to be used to calculate a new potentially different shortest path to all of the destinations in the network. These refreshed or updated shortest paths are to be stored (e.g., in a routing table) and used to route or forward data or traffic.

FIG. 2 is an illustration showing that two or more refresh or update link state advertisements (e.g., LSPs) 206R1, 206R2 need to be transmitted when additional information 217 causes the total amount of link state information to exceed a fixed maximum message size 216. In IS-IS the link state advertisements (e.g., LSPs) have a fixed maximum message size 216. This fixed maximum message size is sometimes referred to as the maximum transfer unit (MTU). As shown on the left-hand side of the illustration, a previously transmitted LSP 206P is shown to have the maximum message size. As shown, both a TLV-A element 214A and a TLV-B element 214B have sizes such that they are both able to fit within the fixed maximum message size and be accommodated within the single previously transmitted LSP 206P.

However, in some cases, after transmission of the previously transmitted LSP 206P, the additional information 217 may need to be included in one or more of the TLV elements (in the illustrated case in the TLV-B element). By way of example, the additional information may include additional link state information for additional links or connections added to the IS-IS network and/or additional information pertaining to existing links (e.g., bandwidth information, level of service information, other traffic engineering information, etc.). In some cases, this additional information may cause the total amount of information to exceed the fixed maximum message size. As shown on the right hand side of the illustration, the TLV-A element 214A and a changed TLV-B' element 214B' having the additional information 217 no longer fit with in the fixed maximum message size of a refresh/update LSP 206R. This is designated by the "X" through the LSP 206R. In such cases, some of the link state information and/or one or more of the TLV elements from previously transmitted LSPP may need to be relocated to an additional link state advertisement or LSP. In the illustration, a first refresh or update LSP 206R1 having the TLV-A element 214A as well as a second refresh or update LSP element 206R2 having the TLV-B' element 214B' with the additional information 217 are transmitted to the network.

In addition to having a fixed maximum message size, IS-IS presently lacks an underlying datagram fragmentation capability. By contrast, OSPF run on the Internet Protocol (IP)

level. As a result, OSPF is able to take advantage of the capability of the underlying TCP/IP stack to perform datagram fragmentation. In datagram fragmentation, the underlying transport layer may fragment or divide a larger packet into two or more smaller packets that may be transmitted, and then on the receiving end the counterpart transport layer may reassemble the two or more smaller packets to re-generate the larger packet and provide the re-generated larger packet to the receiving OSPF protocol. The OSPF protocol does not need to be concerned with the datagram fragmentation process. Consequently, in OSPF additional information may be added to a packet, and the packet may be allowed to grow in size, without the limitation of a fixed maximum message size. In contrast, IS-IS runs directly on the datalink layer and presently lacks an underlying datagram fragmentation mechanism.

SUMMARY

In one aspect, a method performed by a transmitter network element is disclosed. The transmitter network element utilizes a link state routing protocol, which has a maximum link state message size. The method is for providing information to avoid a disruption in data forwarding that would result from a receiver network element performing preferred route computations based on an incomplete set of link state messages. The method includes generating a complete set of link state messages having information indicating that the link state messages are the complete set of the link state messages. The complete set of the link state messages are collectively coherent with a link state of the transmitter network element. The method also includes transmitting the complete set of the link state messages and the information indicating that the link state messages are the complete set of the link state messages to a network. Advantageously, this method may help to avoid the disruption in data forwarding that may result from the receiver network element performing preferred route computations based on the incomplete set of the link state messages.

In another aspect, a transmitter network element that is operable to be deployed in a network and coupled with a receiver network element by a link is disclosed. The transmitter network element is operable to provide information to avoid a disruption in data forwarding that would result from the receiver network element performing preferred route computations based on an incomplete set of link state messages. The transmitter network element includes at least one control card. A link state routing protocol module, of the at least one control card, is operable to use a link state routing protocol that has a maximum link state message size. A route distribution module, of the at least one control card, is operable to generate a complete set of link state messages. The complete set of the link state messages are collectively coherent with a link state of the transmitter network element. A complete set specification module, of the at least one control card, is operable to communicate with the route distribution module, and is operable to specify information to indicate that the link state messages are the complete set. The transmitter network element also includes at least one line card, coupled with the at least one control card, and operable to transmit the complete set of the link state messages and the information to indicate that the link state messages are the complete set to the network. Advantageously, the transmitter network element may help to avoid the disruption in the data forwarding that may otherwise result from the receiver network element performing the preferred route computations based on the incomplete set of the link state messages.

In a further aspect, a method performed by a receiver network element is disclosed. The receiver network element utilizes a link state routing protocol, which has a maximum link state message size. The method is for avoiding a disruption in data forwarding that would result from the receiver network element performing preferred route computations based on an incomplete set of link state messages. The method includes receiving a complete set of link state messages having information indicating that the link state messages are the complete set of the link state messages. The complete set of the link state messages are collectively coherent with a link state of a transmitter network element. The method includes determining that the received complete set of the link state messages are the complete set of the link state messages by using the received information. The method includes delaying performing preferred route computations until after said determining that the received complete set of the link state messages are the complete set of the link state messages. Advantageously, the method may help to avoid the disruption in the data forwarding that may otherwise result from the receiver network element performing the preferred route computations based on the incomplete set of the link state messages.

In yet another aspect, a receiver network element that is operable to be deployed in a network and coupled with a transmitter network element by a link is disclosed. The receiver network element is operable to avoid a disruption in data forwarding that would result from the receiver network element performing preferred route computations based on an incomplete set of link state messages. The receiver network element includes at least one line card that is operable to receive a complete set of link state messages and information to indicate that the link state messages are the complete set of the link state messages from the network. The complete set of the link state messages are collectively coherent with a link state of the transmitter network element. At least one control card of the receiver network element is coupled with the at least one line card. A link state routing protocol module, of the at least one control card, is operable to use a link state routing protocol that has a maximum link state message size. A complete set determination module, of the at least one control card, is operable to determine that the received complete set of the link state messages are the complete set of the link state messages by using the received information. A preferred route computations scheduler module, of the at least one control card, is operable to communicate with the complete set determination module, and is operable to delay scheduling of preferred route computations until after the complete set determination module determines that the received complete set of the link state messages are the complete set of the link state messages. Advantageously, the receiver network element may help to avoid the disruption in the data forwarding that may otherwise result from the receiver network element performing the preferred route computations based on the incomplete set of the link state messages.

BRIEF DESCRIPTION OF THE DRAWINGS

The invention may best be understood by referring to the following description and accompanying drawings that are used to illustrate embodiments of the invention. In the drawings:

FIG. 5 is a block flow diagram of an example embodiment of a method performed by a transmitter network element.

FIG. 6 is a block flow diagram of an example embodiment of a method of performed by a transmitter network element of generating a complete set of link state messages having information indicating that the link state messages are the complete set.

DESCRIPTION OF EMBODIMENTS

In the following description, numerous specific details, such as specific routing protocols, specific types of messages, specific types of information elements, specific modules, specific divisions and configurations of groups of modules, and specific sequences of operations, are set forth in order to provide a more thorough understanding of the present invention. However, it is understood that embodiments of the invention may be practiced without these specific details. In other instances, well-known circuits, structures, full software instruction sequences, and techniques have not been shown in detail in order not to obscure the understanding of this description. Those of ordinary skill in the art, with the included descriptions, will be able to implement appropriate functionality without undue experimentation.

Figure 1:
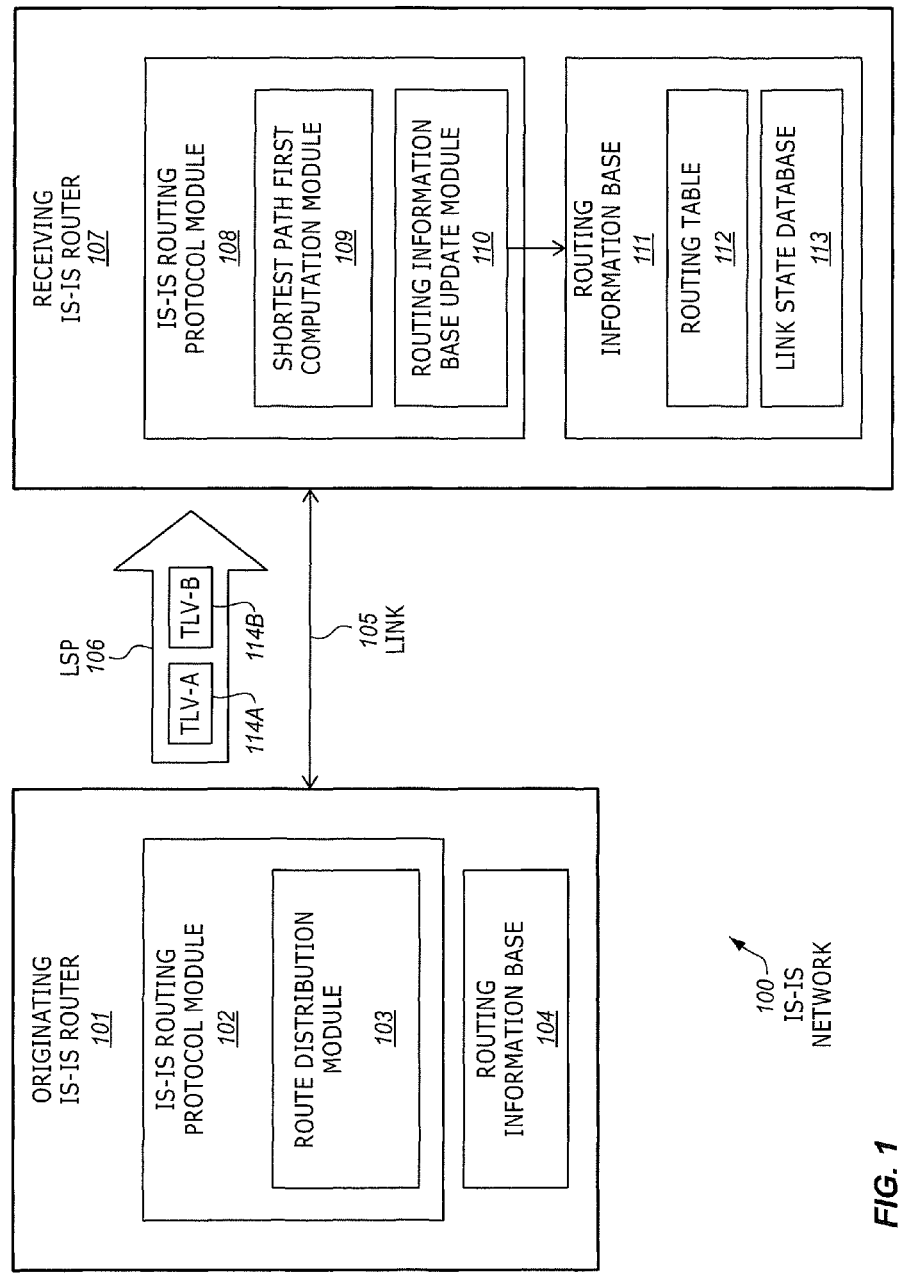
FIG. 1 is a block diagram of an example Intermediate Systems To Intermediate Systems (IS-IS) network.
Figure 2:
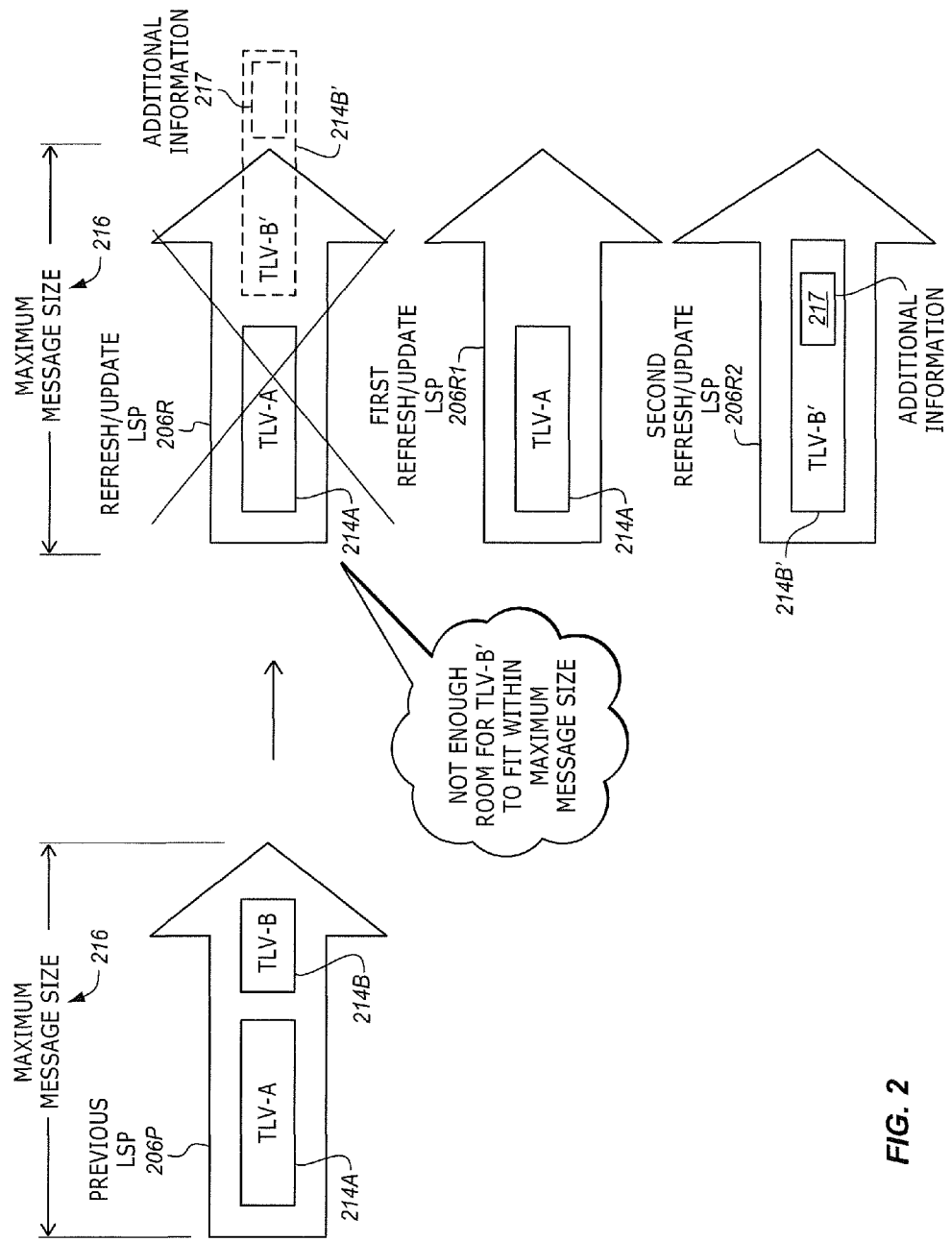
FIG. 2 is an illustration showing that two or more refresh or update link state advertisements need to be transmitted when additional information causes the total amount of link state information to exceed a fixed maximum message size.
Figure 3:
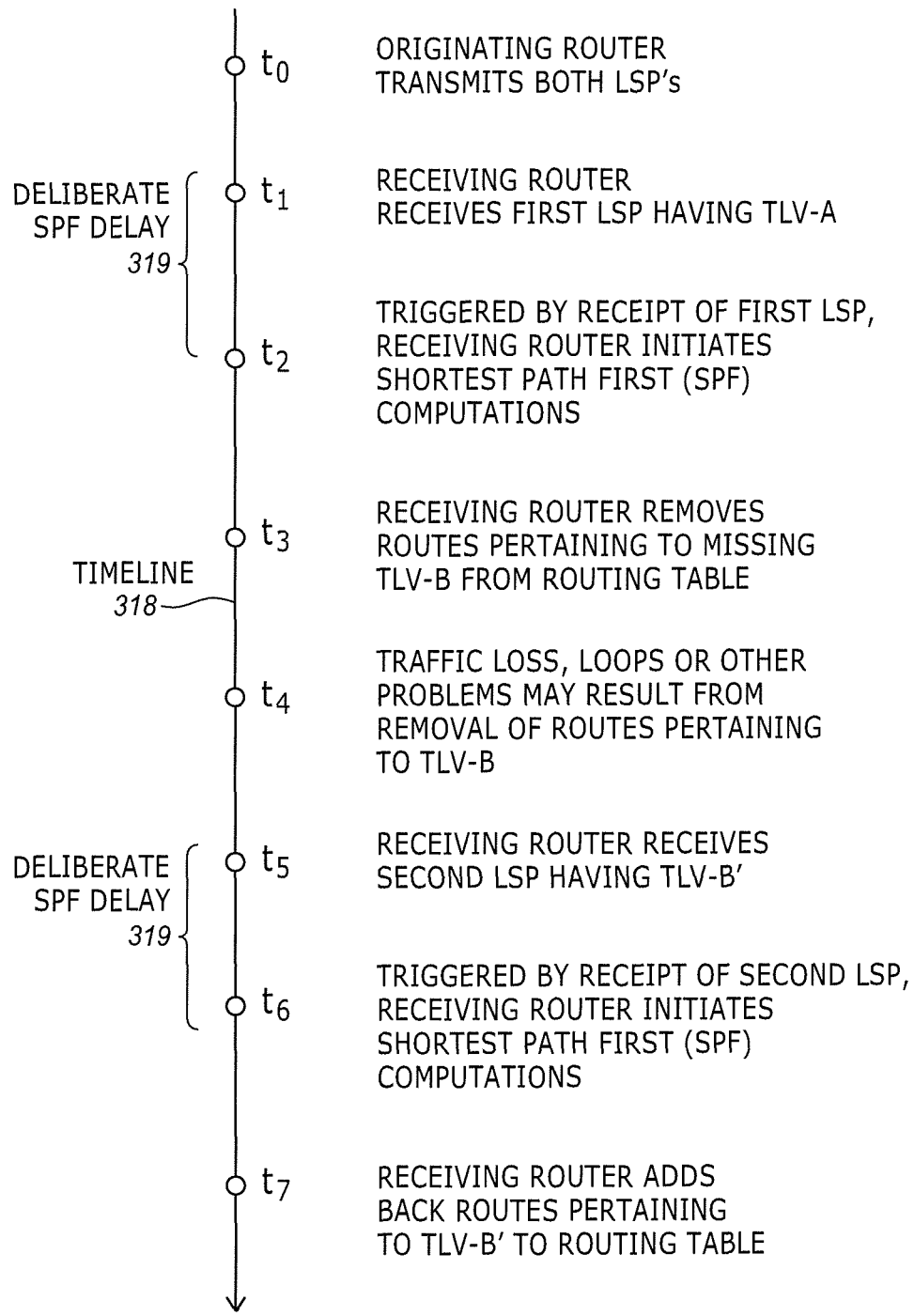
FIG. 3 is a timeline illustrating a disruption in data forwarding as a result of a receiving router prematurely performing shortest path first computations.

FIG. 3 is a timeline 318 illustrating a disruption in data forwarding as a result of a receiving router prematurely performing shortest path first computations after receiving a first refresh or update LSP 206R1 having a TLV-A element 214A but before receiving a second refresh or update LSP 206R2 having a TLV-B' element 214B'. At time t0, an originating router transmits both the first and second refresh or update LSPs 206R1, 206R2 to a network. At time t1, the receiving router receives the first refresh or update LSP 206R1 having the TLV-A element 214A. At time t2, triggered by the reception of the first refresh or update LSP 206R1, the receiving router initiates shortest path first (SPF) computations. Note that at this point in time, the second refresh or update LSP 206R2 having the TLV-B' element 214B' may be on its way to the receiving router, but has not yet been received by the receiving router.

At time t3, the receiving router, as a result of the shortest path first computations, and since the second LSP 206R2 having the TLV-B' element has not yet been received, removes one or more routes pertaining to the previously transmitted TLV-B element 214B. According to IS-IS, the receiving router may implement implicit purging. In implicit purging, the receiving router may interpret the fact that the previously transmitted TLV-B element 214B is missing from the received first LSP 206R1 (when it was present in the previously transmitted LSP 206P) as indicating that connections and/or routes associated with the TLV-B element 214B are no longer available. The receiver router may perceive the TLV-B element 214B as having been purged. Consequently, the receiving router may remove these routes from its routing information base. Such implicit purging may occur when the receiver router starts its decision process and/or shortest path first computations before reception of the second refresh or update LSP 206R2 into which the TLV-B' element (corresponding to the previously transmitted TLV-B element 214B) has been relocated. Significantly, the actual connectivity associated with the removed routes may not actually have been lost, but rather the receiving router may erroneously perceive these connections as being lost.

At time t4, traffic loss, loops in the network, or other data forwarding problems or disruptions may result from the removal of the routes pertaining to the TLV-B element 214B. Link state routing protocols operate based on knowledge of the entire topology. Incomplete topology information, even temporary, can result in traffic loss, routing loops being configured, or other data forwarding problems. Significantly, these data forwarding problems or disruptions may have been created artificially by the receiving router due to implicit purging, rather than being due to actual loss of connections in the network. Such artificially created data forwarding problems are unnecessary and it would be beneficial to avoid them.

At time t5, the receiving router receives the second refresh or update LSP 206R2 having the relocated TLV-B' element 214B'. At time t6, triggered by the reception of the second LSP 206R2, the receiving router again initiates the shortest path first computations. At time t7, the receiving router adds back routes represented in the TLV-B' element including some of the previously removed routes represented in the TLV-B element. After receiving and processing the TLV-B' element the receiving router may determine that the formerly removed routes are actually available they may be added back to the routing table and/or routing information base. The computations performed at time t2 are essentially wasted or unnecessary computations that do not need to be performed. Moreover, these computations at time t2 may take a significant amount of time and may potentially delay the final actually meaningful computations that occur at time t6.

As shown, in some cases, a deliberate shortest path first (SPF) delay 319 may be introduced between the times t1 and t2. Similarly, a deliberate SPF delay 319 may be introduced between the times t5 and t6. Such deliberate SPF delay may help to provide additional time to allow for reception of other LSP before initiating the preferred route computations. If a long delay is used, then there is a good chance that the other LSP will be received, but the preferred route computation process is delayed for a long time. Conversely, if a short delay is used, then the preferred route computation process is not delayed for such a long time, but there is less chance that the other LSP will be received. Commonly, the deliberate delay is on the order of around 50 to 100 ms.

Disclosed herein are transmitter network elements including complete set specification modules that are operable to specify information to indicate that link state messages are a complete set, and methods performed by such transmitter network elements. Also disclosed herein are receiver network elements including complete set determination modules that are operable to determine that a received complete set of link state messages are a complete set using the received information, and methods performed by such receiver network elements.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Network elements are commonly separated into a control plane and a data plane (sometimes referred to as a forwarding plane or a media plane). Typically, a network element includes a set of one or more line cards, a set of one or more control cards, and optionally a set of one or more service cards (sometimes referred to as resource cards). Service cards may be considered control cards if they are used as such. These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics. Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Figure 4:
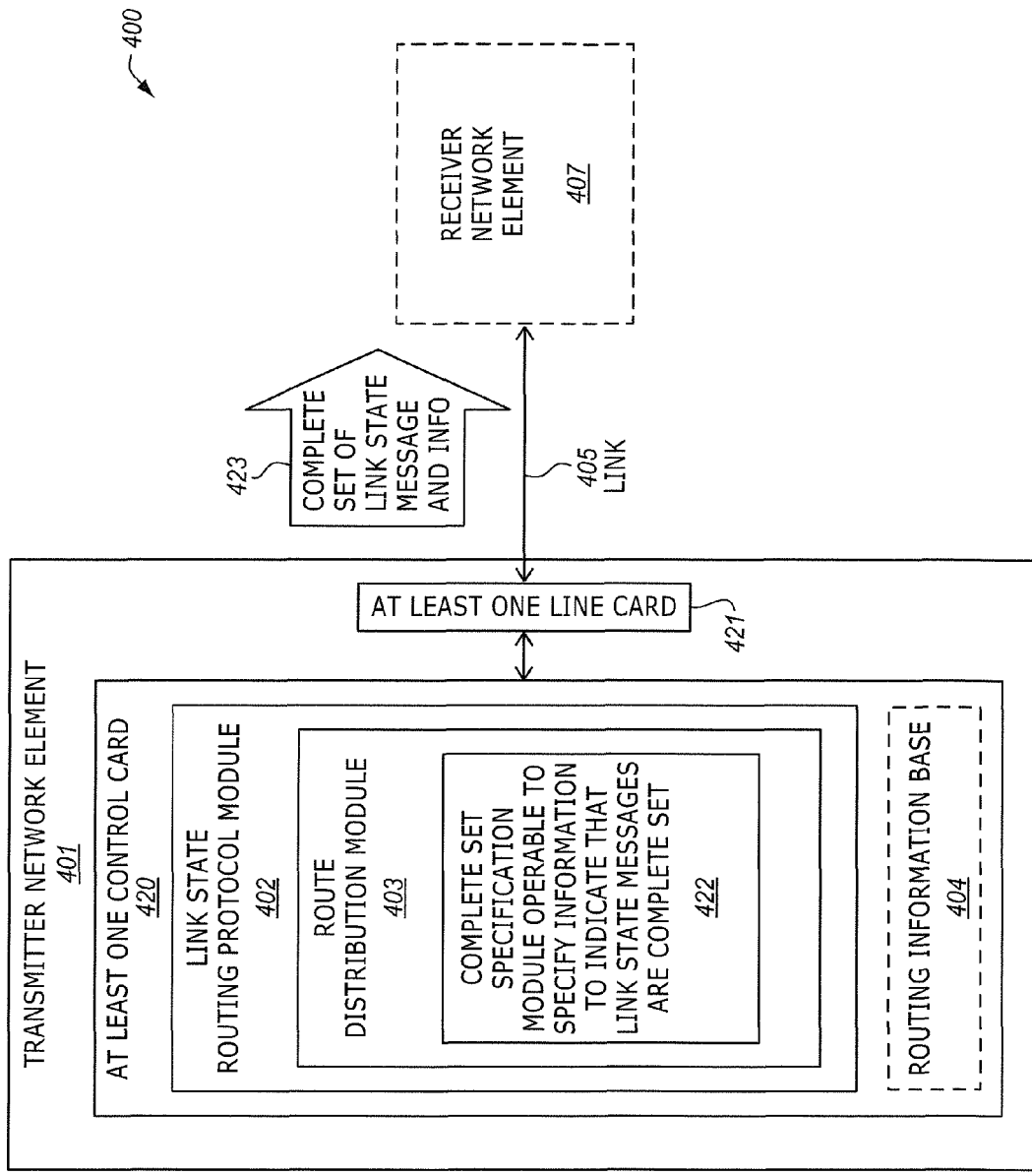
FIG. 4 is a block diagram of an example embodiment of a transmitter network element.

FIG. 4 is a block diagram of an example embodiment of a transmitter network element 401. The transmitter network element is operable to be deployed in a network 400 and coupled with, or in communication with, a receiver network element 407 by a link 405. According to embodiments, the transmitter network element may be operable to provide information to the receiver network element in order to avoid a potential disruption in data forwarding that may otherwise result from the receiver network element prematurely performing preferred route computations (e.g., shortest path first computations) based on an incomplete set of link state messages that are transmitted by the transmitter network element.

The transmitter network element includes at least one control card 420. The transmitter network element also includes a link state routing protocol module 402, of the at least one control card. The link state routing protocol module is operable to use a link state routing protocol that has a maximum link state message size. In some embodiments, the link state routing protocol module may be an IS-IS link state routing protocol module (i.e., inclusive of future versions, releases, editions, or derivations of the IS-IS link state routing protocol, whether or not they still retain the name IS-IS). In other embodiments, the link state routing protocol module may be for a totally different protocol than the IS-IS protocol but may have features similar to those of the IS-IS protocol (e.g., a maximum message size) as long as an embodiment of the transmitter network element is useful for that protocol.

A route distribution module 403, of the at least one control card, is included in the transmitter network element. The route distribution module is operable to generate a complete set of link state messages. As shown, the route distribution module may access a routing information base 404 to generate the link state messages. In some embodiments, the link state messages may be link state protocol data units (LSPs) and/or include type length value (TLV) elements including link state information. Alternatively, the link state messages may be entirely different types of link state messages or advertisements. The complete set of the link state messages may all originate at the same transmitter network element (e.g., they may share the same LSP identification).

In some embodiments, the complete set of the link state messages may be collectively coherent in contents with a link state of the transmitter network element. For example, the complete set of the link state messages may be collectively logically consistent and/or in agreement with the actual link state. In an aspect, the complete set of the link state messages may include a set of link state messages (e.g., LSPs having TLVs) that should be processed atomically or together by the receiver network element in order for the receiver network element to obtain a correct result and/or avoid erroneous removal of routes that actually exist from a routing information base. In some embodiments, the complete set includes a set of refresh or update link state messages that include all of the TLV elements from a single previously sent link state message.

The transmitter network element further includes a complete set specification module 422, of the at least one control card. According to embodiments, the complete set specification module is operable to communicate with the route distribution module. As shown in the illustrated embodiment, the complete set specification module may be part of the route distribution module (e.g., as a sub-module thereof). Alternatively, the complete set specification module may be a separate module coupled with and/or in communication with the route distribution module. According to embodiments, the complete set specification module may be operable to specify information to indicate that the link state messages are the complete set. Specific examples of such information will be disclosed further below.

At least one line card 421, of the transmitter network element, is coupled with the at least one control card 420. The at least one line card is operable to transmit the complete set of the link state messages and the information to indicate that the link state messages are the complete set 423 to the network over the link. The receiver network element may receive the transmitted complete set of link state messages and the information. An example embodiment of a suitable receiver network element is shown and described in conjunction with FIG. 12.

FIG. 5 is a block flow diagram of an example embodiment of a method 524, performed by a transmitter network element, of providing information to a receiver network element in order to avoid a potential disruption in data forwarding that may otherwise result from the receiver network element prematurely performing preferred route computations (e.g., shortest path first computations) based on an incomplete set of link state messages. In some embodiments, the method 524 may be performed by the transmitter network element 401 of FIG. 4. Alternatively, the method 524 may be performed by an entirely different transmitter network element. Moreover, the transmitter network element 401 of FIG. 4 may perform entirely different methods.

In some embodiments, the method may be performed by a transmitter network element utilizing a link state routing protocol which has a maximum link state message size. In some embodiments, the link state routing protocol module may be an IS-IS link state routing protocol module (i.e., inclusive of future versions, releases, editions, or derivations of the IS-IS link state routing protocol, whether or not they still retain the name IS-IS). In other embodiments, the link state routing protocol module may be for a totally different protocol than the IS-IS protocol but may have features similar to those of the IS-IS protocol (e.g., a maximum message size) as long as the method is useful for that protocol.

The method includes generating a complete set of link state messages having information indicating that the link state messages are the complete set of the link state messages, at block 525. In some embodiments, the complete set of the link state messages are collectively coherent with a link state of the transmitter network element.

The method also includes transmitting the complete set of the link state messages and the information indicating that the link state messages are the complete set of the link state messages to a network, at block 526. In some embodiments, the information indicating that the link state messages are the complete set may included within the link state messages of the complete set.

FIG. 6 is a block flow diagram of an example embodiment of a method 625 of generating a complete set of link state messages having information indicating that the link state messages are the complete set. The method 625 is one example of a suitable embodiment for block 525 of FIG. 5.

The method includes generating an identifier for the complete set of the link state messages, at block 627. Over time the transmitting network element may generate and transmit a number of different complete sets of link state messages. Different identifiers may be generated and used to differentiate each complete set from the other complete sets. By way of example, the initial complete set identifier may have a value of 1, or another desired number, thereafter the complete set identifier may be monotonically increased over time for each new complete set, and when the complete set identifier reaches a maximum value the complete set identifier may wrap around and begin again at the lowest value (e.g., 1). The transmitter network element may refrain from using a complete set identifier for a predetermined period of time and/or a maximum age (e.g., in the case of IS-IS commonly about 21 minutes) to allow complete set identifiers already in the system to be cleared out. Alternatively, monotonically decreasing identifiers may be used if desired. In the case of IS-IS, if an Intermediate System (IS) is also a Designated IS (DIS) in one or more of its interfaces, then each pseudo node may have its own complete set identifier, which may be independent of the complete set identifier of the non-pseudo node, or other pseudo nodes. In some embodiments, the complete set identifier may be per LSP identifier based.

The identifier is included in each of the link state messages of the complete set, at block 628. In some embodiments, the identifier may be included in an information element within a link state message. In some embodiments, the information element may include a first field specifying a type of the information element, a second field including the identifier, and a third field specifying a length of the second field. In some embodiments, the information element may be a TLV element.

A total number of the link state messages of the complete set is determined, at block 629. In some embodiments, each link state message of the complete set may be counted as it is generated and/or transmitted to the network.

The total number is included in at least one of the link state messages of the complete set, at block 630. In some embodiments, the total number may be included in only one of the link state messages of the complete set, although this is not required. In some embodiments, the total number may be included in a last-generated link state message without being included in a first-generated link state message, or in some cases without being included in any of the other earlier-generated link state messages except for the last-generated link state message, although this is not required. Including the total number in only the last-generated link state message may help to simplify the implementation. The total number is easily known at the time the last link state message is generated. The total number can be known at the time earlier or the first link state message is generated, but this takes extra effort. Including the total number in only the last-generated link state messages, or alternatively one of several of the last-generated link state messages, may help to avoid or reduce such extra effort.

This is just one illustrative example embodiment of a method of generating a complete set of link state messages having information indicating that the link state messages are the complete set. Other methods are also contemplated. For example, in another embodiment, each link state message may have a different identifier of a set of identifiers, the set of identifiers may be transmitted to the receiver network element, and the receiver network element may compare the different identifier in each of the received link state messages with the set of identifiers to known when it has received the complete set of link state messages. As another example, in another embodiment, rather than sending a total number, efforts may be taken to ensure that the link state messages are transmitted in order, and an end indication may be included in the last message transmitted such that the total number of messages need not be sent. As yet another example, in another embodiment, each of the link state messages could have a same complete set identifier and an additional link state message number (e.g., 1, 2, 3, etc.) and the link state messages may be transmitted with the additional link state message number in reverse order (e.g., 3 before 2, 2 before 1, etc.) so that the receiver network element knows when it has received the complete set. Other approaches are also contemplated.

Figure 7:
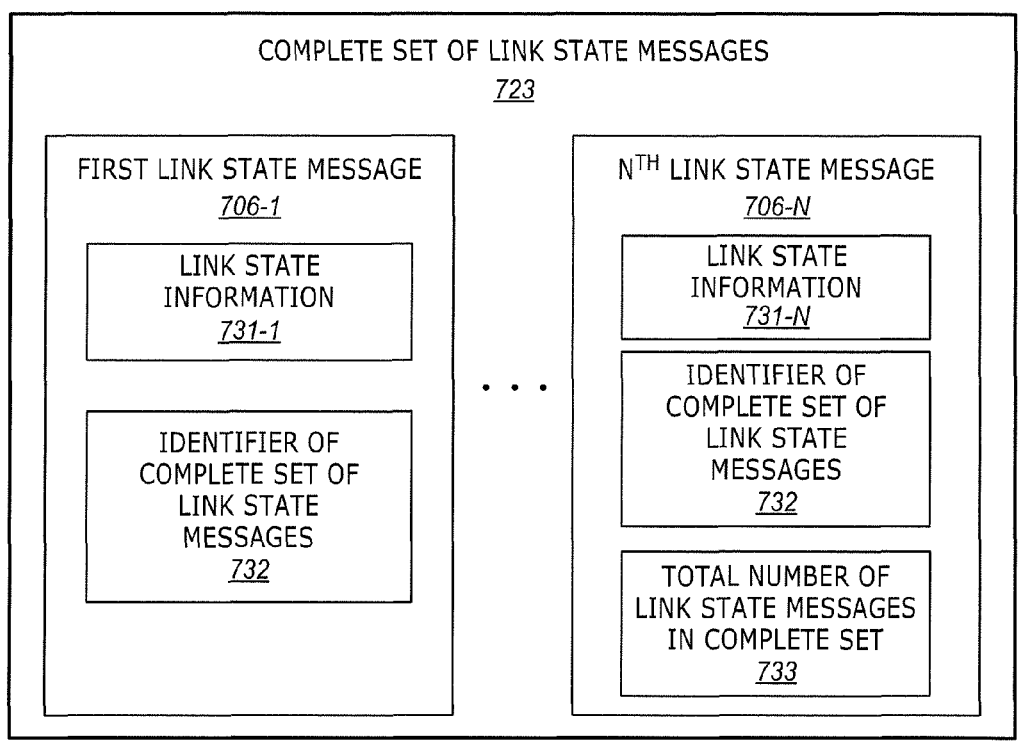
FIG. 7 is a block diagram of an example embodiment of a complete set of link state messages.

FIG. 7 is a block diagram of an example embodiment of a complete set of link state messages 723. The complete set of link state messages includes a first link state message 706-1, an Nth link state message 706-N, and optionally other link state messages (not shown). The number N represents an integer equal to or greater than two. The first link state message includes link state information 731-1 and an identifier of the complete set of link state messages 732. The Nth link state message includes link state information 731-N, an identifier of the complete set of link state messages 732, and a total number of the link state messages in the complete set 733. The link state information may be similar to that conventionally used in link state routing protocols. In some embodiments, the identifiers may each be identical. In some embodiments, any other optional link state messages in the complete set (not shown) may have the identifier but lack the total number, although as discussed above this is not required.

Figure 8:
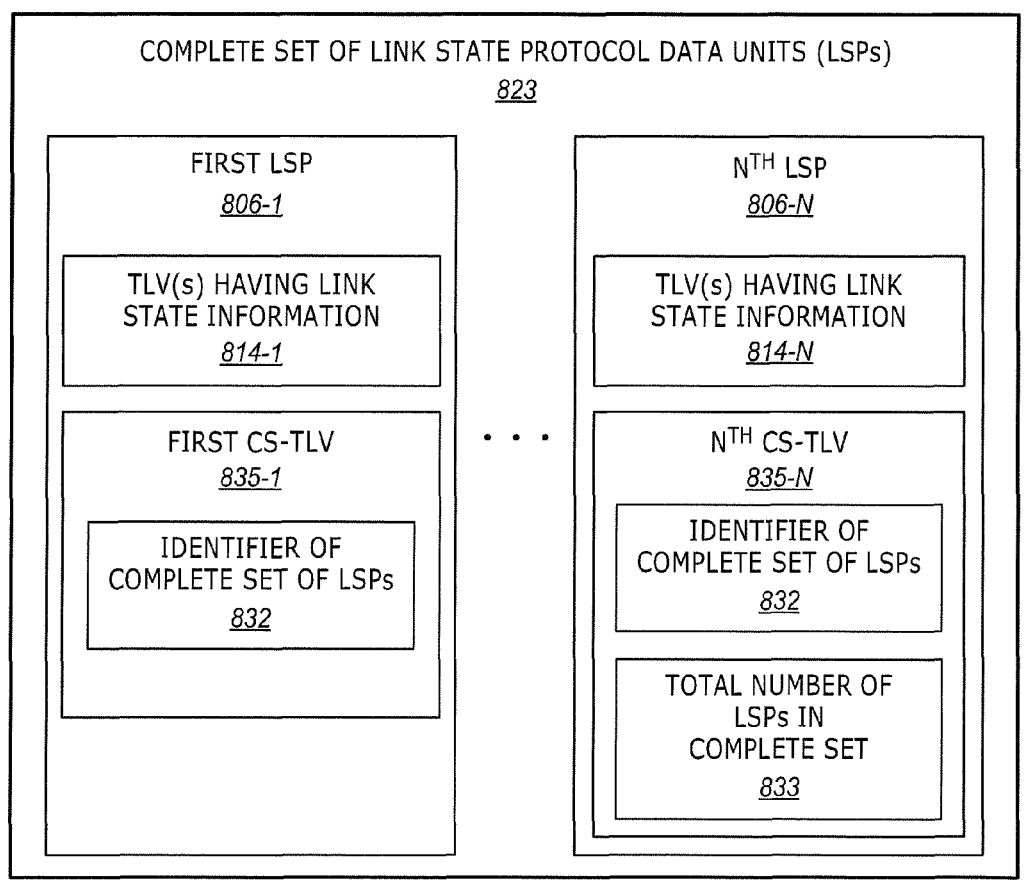
FIG. 8 is a block diagram of an example embodiment of a complete set of link state protocol data units (LSPs).

FIG. 8 is a block diagram of an example embodiment of a complete set of link state protocol data units (LSPs) 823. The complete set of LSPs includes a first LSP 806-1, an Nth LSP 806-N, and optionally other LSPs (not shown). The number N represents an integer equal to or greater than two. The first LSP includes one or more type-length-value (TLV) elements having link state information 814-1, and a first complete set TLV (CS-TLV) 835-1 having an identifier of the complete set of LSPs 832. The Nth LSP includes one or more TLVs having link state information 814-N, and an Nth CS-TLV 835-N having an identifier of the complete set of LSPs 832, and a total number of the LSPs in the complete set 833. In some embodiments, each of the CS-TLVs may have the same unique new type, which may represent a number assigned by the Internet Assigned Numbers Authority (IANA), and which may designate that the TLVs are for purposes of specifying information to indicate a complete set of LSPs. The link state information may be similar to that conventionally used in link state routing protocols, such as, for example, IS-IS. In some embodiments, the identifiers may each be identical. In one aspect, the identifiers may each be an integer represented by 32-bits. Alternatively, either more or less than 32-bits may be used to represent the identifiers. In one aspect, the total number may be an integer represented by 8-bits. In such an aspect, the number N (i.e., the total number of link state messages in the complete set) may range up to 255. Alternatively, either more or less than 8-bits may be used to represent the total number. In some embodiments, any other optional LSPs in the complete set (not shown) may have the identifier but lack the total number, although as discussed above this is not required.

Figure 9A:
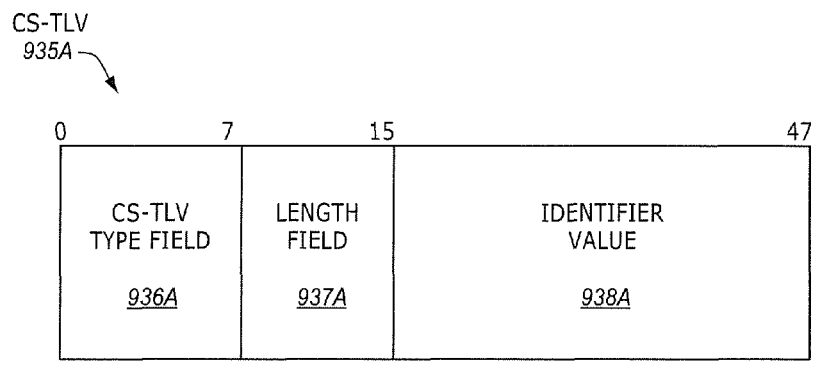
FIG. 9A is a block diagram of a first example embodiment of a complete set type-length-value (CS-TLV) element.

FIG. 9A is a block diagram of a first example embodiment of a complete set TLV (CS-TLV) element 935A. The CS-TLV element represents a tuple or ordered list data structure. The CS-TLV element has a CS-TLV type field 936A, a length field 937A, and an identifier value field 938A. The CS-TLV type field is operable to specify a type of the element, namely that the element is of a type to specify a complete set of link state messages. In some embodiments, the CS-TLV type field may have a series of bit values (e.g., representing an alphanumeric value, number, or code) that are assigned by the Internet Assigned Numbers Authority (IANA), or a similar authority or governing body. As one example, the type field may include the alphanumeric value T-TLV, for transaction TLV, where the transaction includes the complete set of link state messages.

The length field is operable to specify a length (e.g., a length in bits, bytes, etc.) of the identifier value field. The identifier value field is operable to specify an identifier (i.e., a complete set identifier). One advantage of the CS-TLV is that a legacy/older receiver network element that does not recognize the type field may simply skip over the type field to the length field, use the length field to determine the length of the value field, and then skip over the value field using the determined length. In the illustrated example embodiment, the CS-TLV type field is an 8-bit field composed of bits [0:7], the length field is an 8-bit field composed of bits [8:15], and the identifier value field is a 32-bit field composed of bits [16:47]. In an embodiment, the length field may have an integer value of 4 to indicate that the identifier value field is 4-bytes or 32-bits in length. This is just one example embodiment of a suitable CS-TLV. Other embodiments may alter the size one or more of these fields (i.e., make one or more of these fields either larger or smaller), rearrange the order of the fields, or include additional fields, etc.

Figure 9B:
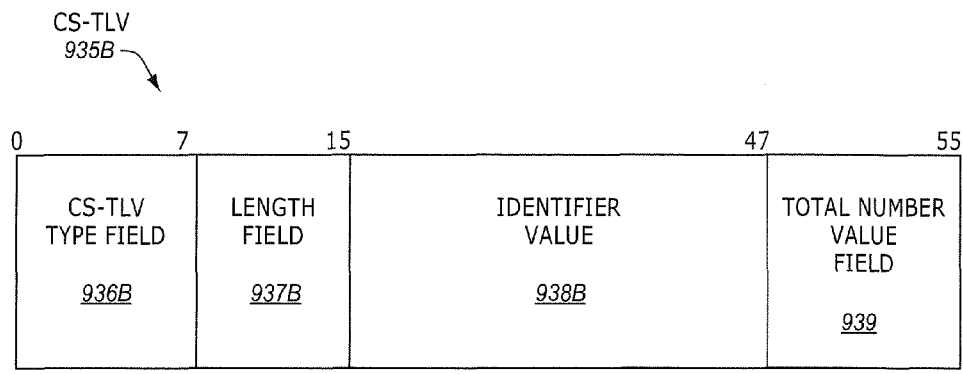
FIG. 9B is a block diagram of a second example embodiment of a complete set type-length-value (CS-TLV) element.

FIG. 9B is a block diagram of a second example embodiment of a CS-TLV element 935B. The CS-TLV element has a CS-TLV type field 936B, a length field 937B, an identifier value field 938B, and a total number value field 939. The CS-TLV type field, the length field, and the identifier value field may be the same as or similar to the correspondingly named fields of the aforementioned first example embodiment of the CS-TLV element. In some embodiments, the CS-TLV type fields 936A, 936B may have a same series of bit values. Alternatively, the CS-TLV type fields 936A, 936B may optionally have a different series of bit values (e.g., assigned by IANA) in order to distinguish between these two different embodiments of CS-TLV elements 935A, 935B.

As shown, the CS-TLV element 935B also includes the total number value field 939 that is operable to specify a total number of link state messages in a complete set. For example, if a complete set includes three link state messages, then the total number value field may have the integer value of 3. In the illustrated example embodiment, the total number value field is an 8-bit field composed of bits [48:55]. Other embodiments may alter the size of this field (i.e., make it larger or smaller). This is just one example embodiment of a suitable CS-TLV. Other embodiments may alter the size one or more of these fields, rearrange the order of the fields, include additional fields, etc.

Figure 10:
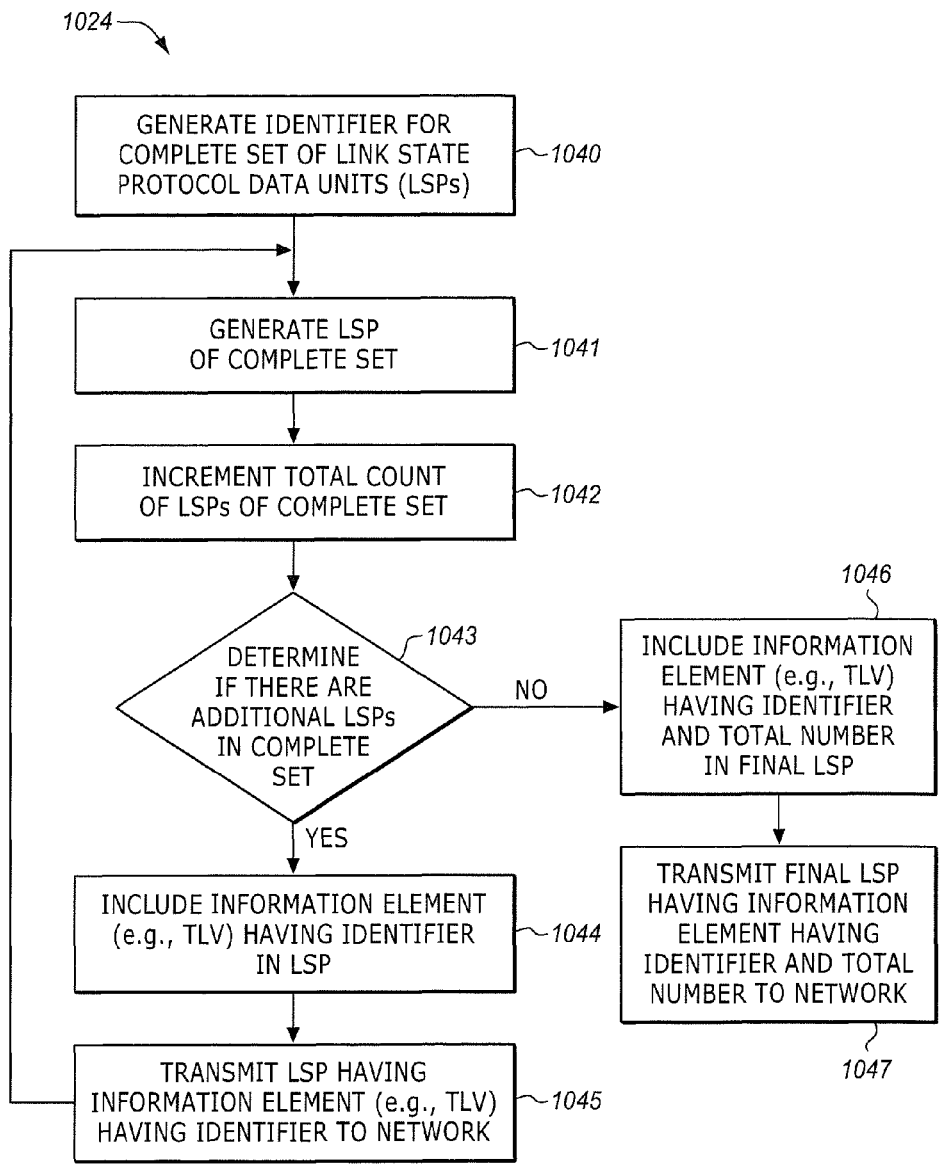
FIG. 10 is a block flow diagram of a detailed example embodiment of a method performed by a transmitter network element.

FIG. 10 is a block flow diagram of a detailed example embodiment of a method 1024, performed by a transmitter network element, of providing information to a receiver network element in order to avoid a potential disruption in data forwarding that may otherwise result from the receiver network element prematurely performing preferred route computations based on an incomplete set of link state messages. The method includes generating an identifier for a complete set of link state protocol data units (LSPs), at block 1040. The identifier may be similar to the identifiers previously described. An LSP of the complete set is generated, at block 1041. A total count of LSPs of the complete set is incremented, at block 1042. A determination is made, at block 1043, if there are additional LSPs in the complete set. If there are additional LSPs in the complete set (i.e., "yes" is the determination), then an information element (e.g., a TLV) having the identifier is included in the LSP, at block 1044. Then, the LSP having the information element (e.g., the TLV) having the identifier is transmitted to a network, at block 1045. The method then revisits block 1041 where another LSP of the complete set is generated, etc. Conversely, if there are not additional LSPs in the complete set (i.e., "no" is the determination at block 1043), then an information element (e.g., a TLV) having the identifier and the total count or total number of the LSPs in the complete set (i.e., as last counted at block 1042) is included in the final LSP of the complete set, at block 1046. Then, the final LSP having the information element (e.g., the TLV) having the identifier and the total number is transmitted to the network, at block 1047.

Figure 11:
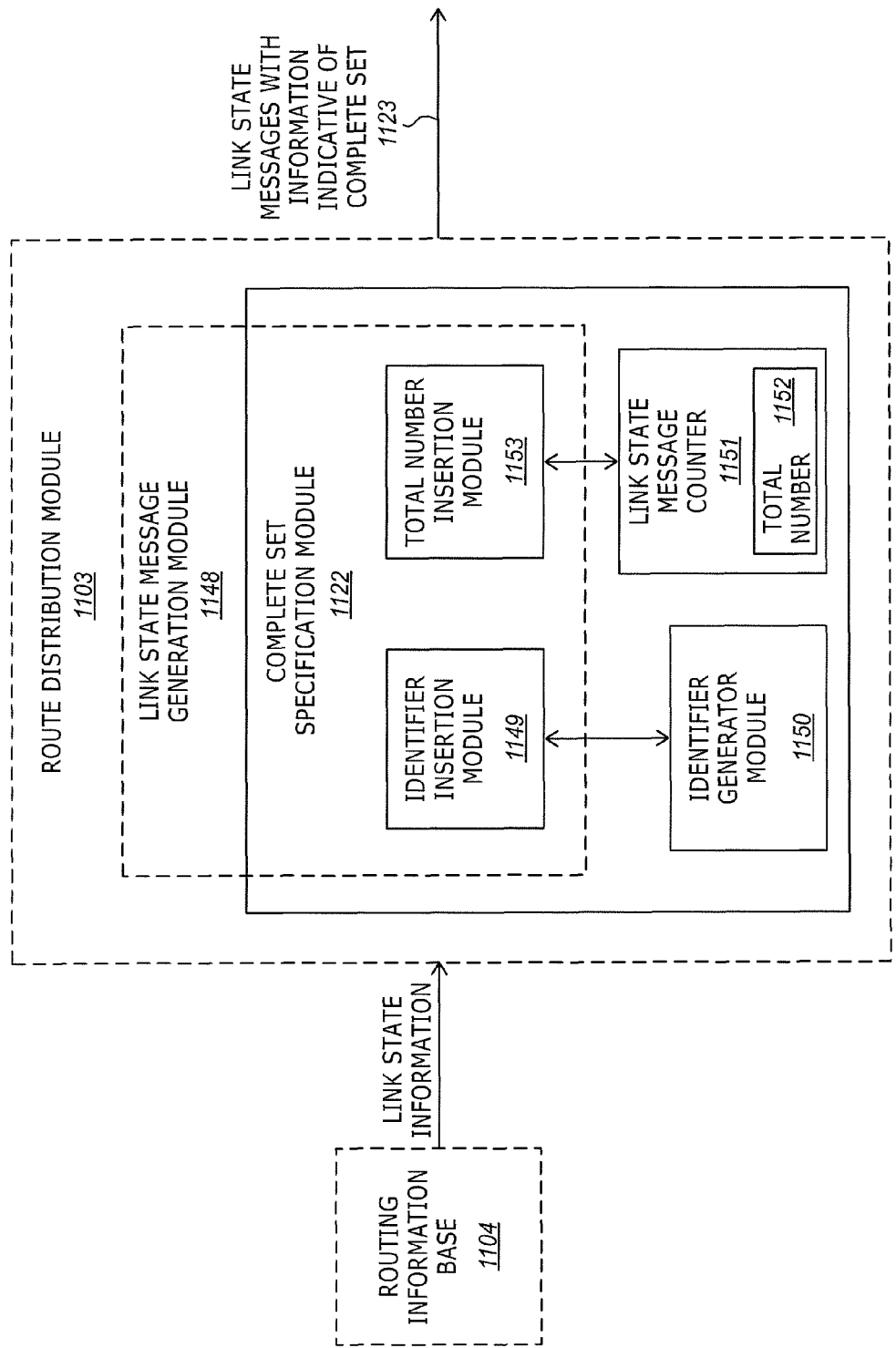
FIG. 11 is a block diagram of an example embodiment of a complete set specification module suitable for a transmitter network element.

FIG. 11 is a block diagram of an example embodiment of a complete set specification module 1122 suitable for a transmitter network element. In some embodiments, the complete set specification module 1122 may be included in the transmitter network element 401 of FIG. 4. Alternatively, the complete set specification module 1122 may be included in an entirely different transmitter network element. Moreover, the transmitter network element 401 may include an entirely different complete set specification module. In some embodiments, the complete set specification module 1122 may perform the method of FIG. 5 and/or the method of FIG. 6. Alternatively, the complete set specification module 1122 may perform entirely different methods. Moreover, the methods of FIG. 5 and/or FIG. 6 may be performed by an entirely different complete set specification module.

A route distribution module 1103 is shown in the illustration. The route distribution module is operable to generate a complete set of link state messages. As shown, the route distribution module may access a routing information base 1104 to obtain link state information to generate the link state messages. The route distribution module includes a link state message generation module 1148. The link state message generation module is operable to generate the link state messages using the link state information. The complete set specification module 1122 is operable to communicate with the route distribution module. In the illustration, the complete set specification module is shown to be part of the route distribution module. An identifier insertion module 1149 and a total number insertion module 1153, of the complete set specification module, are shown to be a part of the link state message generation module 1148. Alternatively, the complete set specification module may be a separate module coupled with and/or in communication with the route distribution module and/or the link state message generation module.

According to some embodiments, the complete set specification module may be operable to specify information to indicate that the link state messages are the complete set. The complete set specification module includes an identifier generator module 1150, the identifier insertion module 1149, a link state message counter 1151, and the total number insertion module 1153. The identifier generator module is operable to generate an identifier for the complete set of the link state messages. The identifier insertion module is operable to have the identifier inserted or otherwise included in each of the link state messages of the complete set. In some embodiments, the identifier insertion module is operable to have the identifier included in an information element (e.g., a TLV element) in a link state message (e.g., an LSP). The link state message counter is operable to count a total number 1152 of the link state messages of the complete set. The total number insertion module is operable to have the total number included in at least one of the link state messages of the complete set (e.g., in a last-generated link state message).

Figure 12:
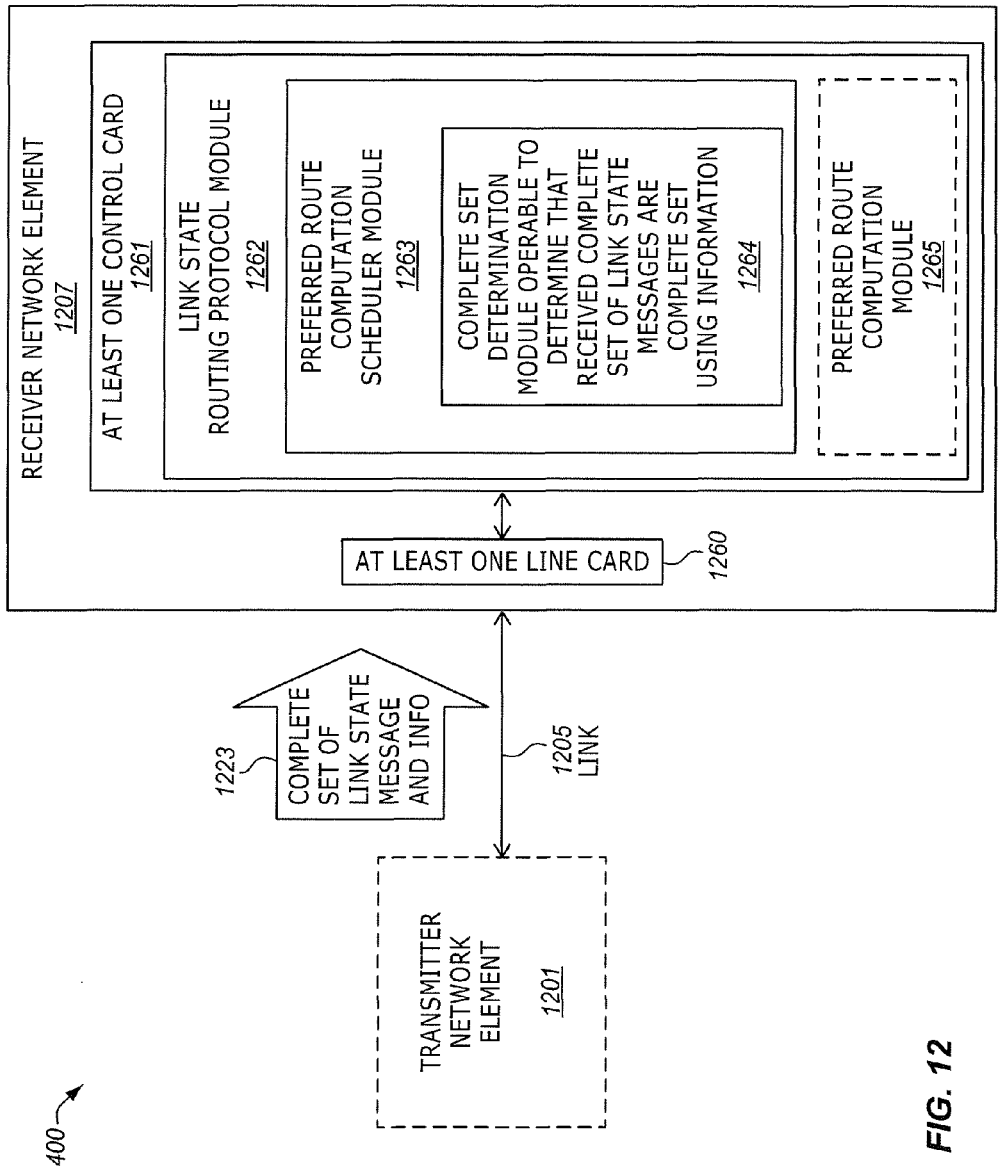
FIG. 12 is a block diagram of an example embodiment of a receiver network element.

FIG. 12 is a block diagram of an example embodiment of a receiver network element 1207. The receiver network element is operable to be deployed in a network 400 and coupled with, or in communication with, a transmitter network element 1201 by a link 1205. According to embodiments, the receiver network element may be operable to avoid a potential disruption in data forwarding that may otherwise result from the receiver network element prematurely performing preferred route computations (e.g., shortest path first computations) based on an incomplete set of received link state messages.

The receiver network element includes at least one line card 1260. The at least one line card is operable to receive a complete set of link state messages and information to indicate that the link state messages are the complete set of the link state messages 1223 from the network. The complete set of the link state messages may all originate at the same transmitter network element (e.g., they may share the same LSP identification). In some embodiments, the complete set of the link state messages are collectively coherent with a link state of the transmitter network element. For example, the complete set of the link state messages may be collectively logically consistent and/or in agreement with the actual link state. In an aspect, the complete set of the link state messages may include a set of link state messages (e.g., LSPs having TLVs) that should be processed atomically or together by the receiver network element in order for the receiver network element to obtain a correct result and/or avoid erroneous removal of routes that actually exist from a routing information base.

The receiver network element includes at least one control card 1261 coupled with the at least one line card 1260. A link state routing protocol module 1262, of the at least one control card, is operable to use a link state routing protocol, which has a maximum link state message size. In some embodiments, the link state routing protocol module may be an IS-IS link state routing protocol module (i.e., inclusive of future versions, releases, editions, or derivations of the IS-IS link state routing protocol, whether or not they still retain the name IS-IS). In other embodiments, the link state routing protocol module may be for a totally different protocol than the IS-IS protocol but may have features similar to those of the IS-IS protocol (e.g., a maximum message size) as long as an embodiment of the receiver network element is useful for that protocol.

A complete set determination module 1264, of the at least one control card, is operable to determine that the received complete set of the link state messages are the complete set of the link state messages by using the received information. In some embodiments, the link state messages may be link state protocol data units (LSPs) and/or include type length value (TLV) elements including link state information. Alternatively, the link state messages may be entirely different types of link state messages or advertisements.

A preferred route computations scheduler module 1263, of the at least one control card, is operable to communicate with the complete set determination module 1264. The preferred route computations scheduler module is operable to delay scheduling of preferred route computations until after the complete set determination module determines that the received complete set of the link state messages are the complete set of the link state messages. As shown in the illustrated embodiment, the complete set determination module may be part of the preferred route computations scheduler module (e.g., as a sub-module thereof). Alternatively, the complete set determination module may be a separate module coupled with and/or in communication with the preferred route computations scheduler module.

Advantageously, the ability to determine when a complete set of link state messages has been received, and the ability to delay preferred route computations until after the complete set has been received may help to avoid certain problems discussed in conjunction with FIG. 3. For one thing, this may help to avoid erroneously removing routes due to implicit purging when the routes should not necessarily be removed because the underlying connections are still present. This may also help to avoid performing what are essentially wasted and unnecessary preferred route computations that may actually delay the final preferred route computations that actually need to be performed. In some cases, such as if an originating network element receives a burst of redistributed routes, it may send out dozens of link state messages for advertising those routes. Waiting to receive a complete set of link state messages may avoid numerous unnecessary preferred route computations and network churns. Moreover, in some cases, only the final preferred route computation based on the complete set may be kick started immediately after the complete set is received.

A preferred route computation module 1265 is coupled with or in communication with the preferred route computations scheduler module. In some embodiments, the preferred route computations may be a shortest path first computation module and/or a route computation module based on or derived from Dijkstra's algorithm.

Figure 13:
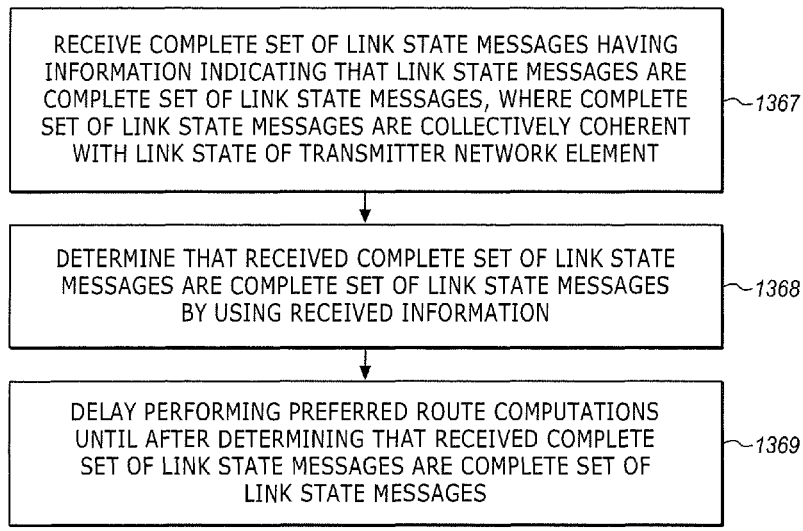
FIG. 13 is a block flow diagram of an example embodiment of a method performed by a receiver network element.

FIG. 13 is a block flow diagram of an example embodiment of a method 1366, performed by a receiver network element, of avoiding a potential disruption in data forwarding that may otherwise result from the receiver network element prematurely performing preferred route computations (e.g., shortest path first computations) based on an incomplete set of received link state messages. In some embodiments, the method 1366 may be performed by the receiver network element 1207 of FIG. 12. Alternatively, the method 1366 may be performed by an entirely different receiver network element. Moreover, the receiver network element 1207 may perform entirely different methods.

In some embodiments, the method may be performed by a receiver network element utilizing a link state routing protocol, which has a maximum link state message size. In some embodiments, the link state routing protocol module may be an IS-IS link state routing protocol module (i.e., inclusive of future versions, releases, editions, or derivations of the IS-IS link state routing protocol, whether or not they still retain the name IS-IS). In other embodiments, the link state routing protocol module may be for a totally different protocol than the IS-IS protocol but may have features similar to those of the IS-IS protocol (e.g., a maximum message size) as long as the method is useful for that protocol.

The method includes receiving a complete set of link state messages having information indicating that the link state messages are the complete set of the link state messages, at block 1367. In some embodiments, the complete set of the link state messages are collectively coherent with a link state of a transmitter network element. The method also includes determining that the received complete set of the link state messages are the complete set of the link state messages by using the received information, at block 1368. The method further includes delaying performing preferred route computations until after said determining that the received complete set of the link state messages are the complete set of the link state messages, at block 1369. Advantageously, such a method may help to avoid erroneously removing routes (e.g., from a routing information base) as a result of implicit purging when link state information (e.g., one or more TLVs) are relocated from a link state message into an additional link state message. The receiver network element does not perform the preferred route computations until all link state messages of the complete set have been received and so does not erroneously infer that routes, which are actually present, have been removed.

In some embodiments, performance of the preferred route computations may be initiated in response to or as a result of determining that the received complete set of the link state messages are the complete set of the link state messages. In other words, such a determination may be used to kick start the preferred route computations so that the preferred route computations may start quickly after receipt of the complete set of link state messages without further unnecessary delay. In some embodiments, additional information may also optionally be deferred from being updated until after determination of reception of a complete set of messages, such as, for example, traffic engineering information to its corresponding database.

Figure 14:
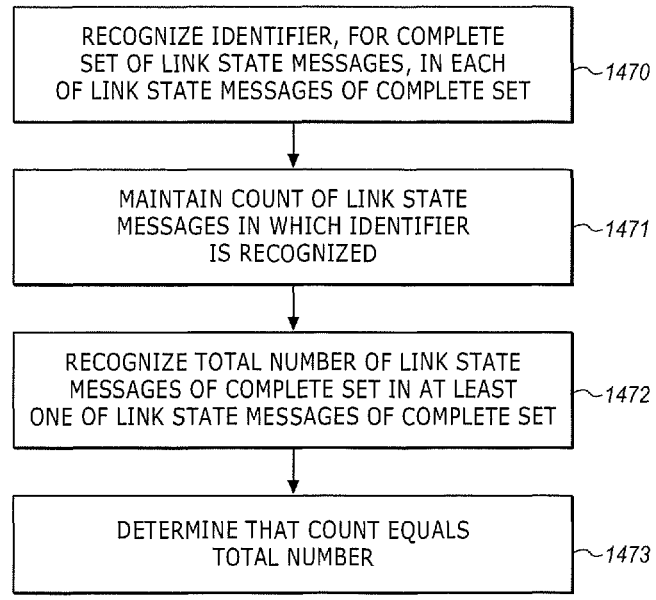
FIG. 14 is a block flow diagram of an example embodiment of a method performed by a receiver network element of determining that a received complete set of link state messages are a complete set of link state messages by using received information.

FIG. 14 is a block flow diagram of an example embodiment of a method 1468 of determining that a received complete set of link state messages are a complete set of link state messages by using received information indicating such. The method 1468 is one example of a suitable embodiment of block 1368 of FIG. 13.

The method includes recognizing an identifier, for the complete set of the link state messages, in each of the link state messages of the complete set, at block 1470. In some embodiments, the identifier may be recognized in an information element (e.g., a TLV) within a link state message. A count of the link state messages, in which the identifier is recognized, is maintained, at block 1471. In one aspect, a counter may be incremented for each link state message having the identifier. A total number of the link state messages is recognized, in at least one of the link state messages of the complete set, at block 1472. In some embodiments, the total number may be recognized in only one of the link state messages of the complete set (e.g., in a last-generated link state message), although this is not required. It is determined that the count equals the total number, at block 1473. In one aspect, this may involve comparing the current count with the total number when it is known.

This is just one illustrative example embodiment of a method of determining that a received complete set of link state messages are a complete set. Other methods are also contemplated. For example, in another embodiment, link state messages each having a different identifier of a complete set of identifiers may be received, the complete set of identifiers may be received, and the receiver network element may compare the identifiers in the received link state messages with the complete set of the identifiers to determine whether or not all link state messages have been received. As another example, in another embodiment, each of the link state messages could have a same complete set identifier and an additional link state message number (e.g., 1, 2, 3, etc.) and the link state messages may be received with the additional link state message number in reverse order (e.g., 3 before 2, 2 before 1, etc.) so that the receiver network element is able to know when it has received the complete set. Other approaches are also contemplated.

Figure 15:
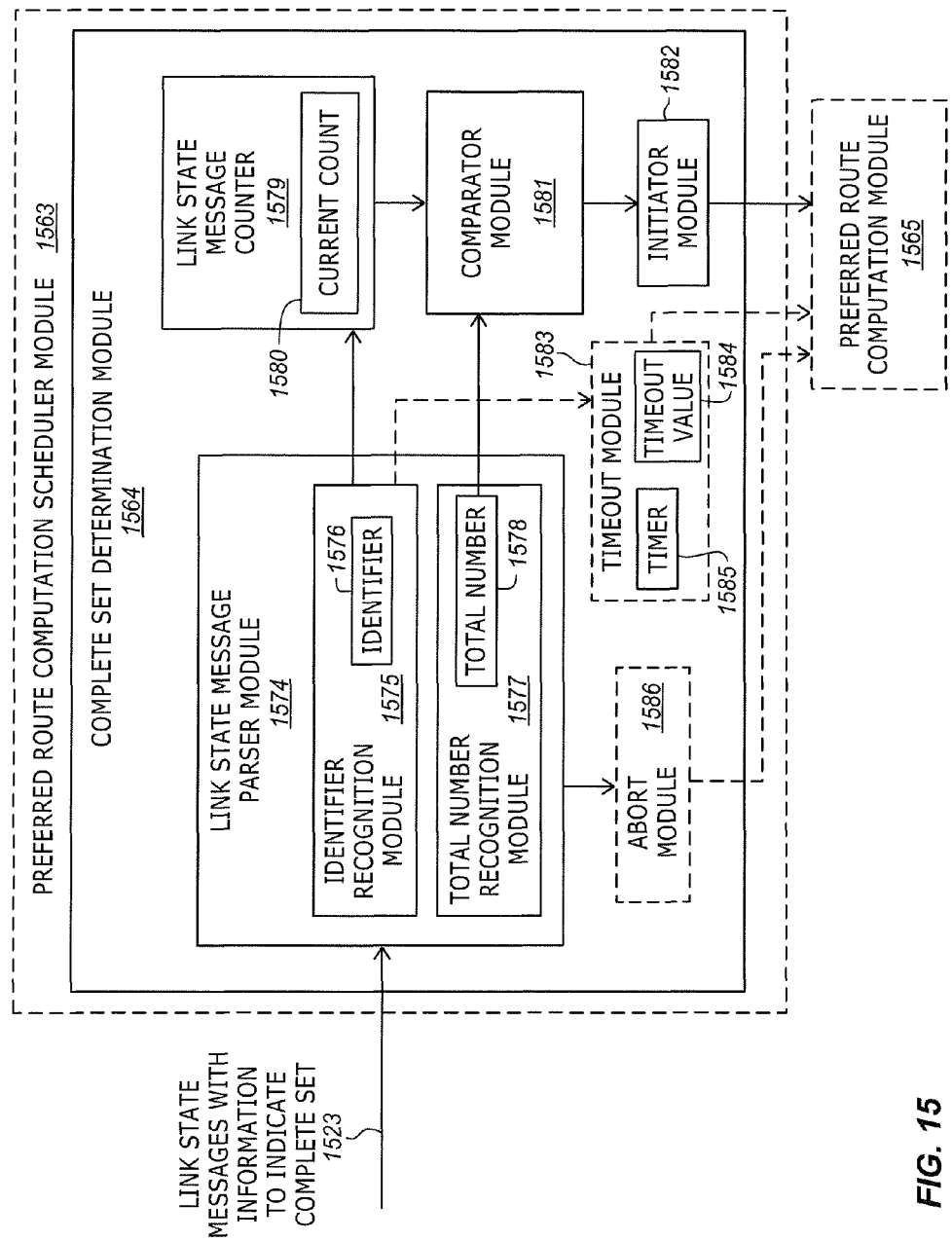
FIG. 15 is a block diagram of an example embodiment of a complete set determination module suitable for a receiver network element.

FIG. 15 is a block diagram of an example embodiment of a complete set determination module 1564 suitable for a receiver network element. In some embodiments, the complete set determination module 1564 may be included in the receiver network element 1207 of FIG. 12. Alternatively, the complete set determination module 1564 may be included in an entirely different receiver network element. Moreover, the receiver network element 1207 may include an entirely different complete set determination module. In some embodiments, the complete set determination module 1564 may perform the method of FIG. 13 and/or the method of FIG. 14. Alternatively, the complete set determination module 1564 may perform entirely different methods. Moreover, the method of FIG. 13 and/or the method of FIG. 14 may be performed by an entirely different complete set determination module.

A preferred route computation scheduler module 1563 is shown in the illustration. The preferred route computation scheduler module is operable to schedule preferred route computation (e.g., shortest path first computation). As shown, the preferred route computation scheduler module may access a preferred route computation module 1565 to initiate the preferred route computations. The complete set determination module 1564 is operable to communicate with the preferred route computation scheduler module. In the illustration, the complete set determination module is shown to be part of the preferred route computation scheduler module. Alternatively, the complete set determination module may be a separate module coupled with and/or in communication with the preferred route computation scheduler module.

According to some embodiments, the complete set determination module 1564 may be operable to determine that a received complete set of link state messages are a complete set. The illustrated complete set determination module includes a link state message parser module 1574. The parser module includes an identifier recognition module 1575 and a total number recognition module 1577. The identifier recognition module is operable to recognize an identifier 1576, for the complete set of the link state messages, in each of the link state messages of the complete set. By way of example, the identifier may be recognized in a value field of a CS-TLV element (e.g., the CS-TLV element of FIG. 9A). The first time a new identifier is encountered a new complete set may be inferred and opened. In one aspect, the identifier may be stored or preserved for future reference.

A link state message counter 1579 of the complete set determination module is coupled or in communication with the identifier recognition module. The link state message counter is operable to maintain a current count 1580 of the number of link state messages in which the identifier is recognized. Each time an additional link state message having the identifier is received the local count may be incremented by one. The total number recognition module 1577 is operable to recognize a total number 1578, of the link state messages of the complete set, in at least one of the link state messages of the complete set. By way of example, the total number may be recognized in the total number value field of a CS-TLV element (e.g., the CS-TLV element of FIG. 9B). In one aspect, the total number may be stored or preserved for future reference. A comparator module 1581 of the complete set determination module is coupled or in communication with the total number recognition module and the link state message counter. The comparator module is operable to compare the current count 1580 with the total number 1578. Link state messages of the complete set may not arrive in the order that they were generated and/or transmitted. Accordingly, potentially even a last-generated and/or transmitted link state message specifying the total number may be received prior to one or more other link state messages of the complete set.

The preferred route computation scheduler module and/or the complete set determination module also have an optional initiator module 1582. The initiator module is operable to initiate the preferred route computation module 1565 to perform preferred route computations responsive to the complete set determination module determining that the received complete set of the link state messages are the complete set. In some embodiments, the initiator module may kick start the preferred route computations as soon as the determination of equality is made so that preferred route computations, once they have the complete set of information to obtain correct results, are not further delayed.

The complete set determination module also has an optional timeout module 1583. The timeout module may have a timeout value 1584 and a timer 1585. The timeout value may be configurable. The timer may be initiated upon receipt of a first link state message of a set that has a new identifier. The timer may count time since the first message has been received. If the timer reaches the timeout value prior to a determination that the complete set of link state messages has been received (e.g., one of the link state messages is slow to arrive or is missing,), then the timeout module may initiate the preferred route computation module to perform the preferred route computations. Although in such cases, some traffic forwarding problems may occur, as with the conventional approach of prematurely processing incomplete sets of link state messages, typically such cases will be relatively rare. The use of such a timeout counter may help to avoid excessively long delays waiting on missing link state messages that are excessively slow or may not arrive. The timeout counter may be cancelled when the complete set determination is made for a given identifier.

An abort module 1586 may also optionally be included. If an error occurs, the abort module may initiate the receiver network element to fallback to performing the preferred route computations without the complete set of link state messages.

In some cases there may be many LSPs in a complete set. For example, this may be the case in the event of a graceful restart. A graceful restart may occur in the event of a crash, hardware change, network element being restarted, etc. The graceful restart process may cause the network element to forget its routing information base content. The network element may send out a large number of LSPs as part of a process of regaining its knowledge to regenerate the routing table. In the particular case of IS-IS, up to a maximum of 255 of such LSPs are allowed. Problems with implicit purging may occur if the TLVs are distributed/ordered among these newly sent out LSPs differently than the way the TLVs were distributed/ordered among the previous sent out LSPs. However, it often tends to be difficult to ensure that the TLVs are distributed/ordered among these newly sent out LSPs exactly the same way that the TLVs were distributed/ordered among the previous sent out LSPs. Because the routing information base does not necessary supply the redistributed routes in the same order as in the pre-restart time, reconstruct LSPs may have the TLVs reordered. When the number of redistributed routes is high, the TLVs may be distributed over many LSPs. Without the embodiments disclosed herein, when the set of LSPs reaches other receiving network elements, the same issue with implicit purging may arise, even if there is no change to redistributed routes at all.

The embodiments disclosed utilizing the specification and determination/recognition of the complete set of link state messages allow for the possibility of reordering these LSPs after a graceful restart without encountering the same level of implicit purging problems. The restarting transmitter network element may specify a complete set all LSPs that are subject to TLV reordering, and transmit them upon exit of its graceful restart process. In some embodiments, tens, or even hundreds of link state messages may be included in a complete set. In some embodiments, all of these TLVs (e.g., up to 255 for IS-IS or the maximum number for the given protocol) may be included in the same complete set. The receiving network element may recognize the complete set and not mistakenly purge some external reachability prefixes. Advantageous, this may help to avoid or at least reduce the aforementioned problems with implicit purging and associated problems that may tend to occur (e.g., traffic loss, loops, etc.). Additionally, this may help to avoid an excessive number of unnecessary sequential preferred routing computations (e.g., up to a maximum of 255 of such sequential preferred routing computations), which may waste a significant amount of processing and delay the final computations that are actually meaningful.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below. In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as tangible, non-transitory computer-readable storage media and non-tangible transitory computer-readable communication or transmission media. A few representative examples of tangible, non-transitory computer-readable storage media include, but are not limited to, magnetic disks; optical disks; random access memory (RAM), such as static-RAM (SRAM) and dynamic-RAM (DRAM), read only memory (ROM), such as programmable ROM (PROM), erasable-and-programmable ROM (EPROM), and electrically-erasable-and-programmable ROM (EEPROM), flash memory devices; phase-change memory, and the like. The tangible storage media may include one or more solid or tangible physical materials, such as, for example, a semiconductor material, a phase change material, a magnetic material, etc.

Embodiments pertain to an article of manufacture that includes a tangible non-transitory computer-readable storage media storing a sequence of instructions that if executed by a machine (e.g., a network element, switch, router, end station, host, computer system, or electronic device having at least one microprocessor) causes or results in the machine performing one or more operations or methods disclosed herein. A few representative examples of non-tangible transitory computer-readable communication or transmission media include, but are not limited to, electrical, optical, acoustical or other form of propagated signals—such as carrier waves, infrared signals, digital signals. In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

What is claimed is:

1. A method, performed by a transmitter network element utilizing a link state routing protocol which has a maximum link state message size, of providing information to avoid a disruption in data forwarding that would result from a receiver network element performing preferred route computations based on an incomplete set of link state messages, the method comprising the steps of:

generating a complete set of link state messages having information indicating that the link state messages are the complete set of the link state messages, wherein the complete set of the link state messages are collectively coherent with a link state of the transmitter network element, wherein the information indicating that the link state messages are the complete set of the link state messages is included in complete set type-length-value (CS-TLV) elements that do not have link state information; and transmitting the complete set of the link state messages and the information indicating that the link state messages are the complete set of the link state messages to a network.

2. The method of claim 1, wherein the step of generating the complete set of the link state messages having the information indicating that the link state messages are the complete set of the link state messages comprises the steps of:

generating an identifier for the complete set of the link state messages;

including the identifier in each of the link state messages of the complete set;

determining a total number of the link state messages of the complete set; and including the total number in at least one of the link state messages of the complete set.

3. The method of claim 2, wherein the step of including the identifier in each of the link state messages comprises including the identifier in an information element in a link state message, and wherein the information element includes a first field specifying a type of the information element, a second field including the identifier, and a third field specifying a length of the second field.

4. The method of claim 1, wherein the step of generating the complete set of the link state messages having the information indicating that the link state messages are the complete set of the link state messages comprises generating a complete set of link state protocol data units (LSPs) each having a type-length-value (TLV) element having the information indicating that the LSPs are the complete set.

5. The method of claim 1, wherein the complete set of the link state messages is a subset of link state messages generated by the transmitter network element that includes all type-length-value (TLV) elements from a single previously sent link state message.

6. A transmitter network element, the transmitter network element operable to be deployed in a network and coupled with a receiver network element by a link, the transmitter network element operable to provide information to avoid a disruption in data forwarding that would result from the receiver network element performing preferred route computations based on an incomplete set of link state messages, the transmitter network element comprising:
at least one control card;
a link state routing protocol module of the at least one control card, the link state routing protocol module operable to use a link state routing protocol that has a maximum link state message size;
a route distribution module of the at least one control card, the route distribution module operable to generate a complete set of link state protocol data units (LSPs), wherein the complete set of the LSPs are collectively coherent with a link state of the transmitter network element, wherein each of the LSPs has one or more type-length-value (TLV) elements having link state information; and
a complete set specification module of the at least one control card, the complete set specification module operable to communicate with the route distribution module, the complete set specification module operable to specify information to indicate that the LSPs are the complete set, wherein the complete set specification module is to cause the complete set of the LSPs to include complete set TLVs (CS-TLVs) having the information to indicate that the LSPs are the complete set but not having link state information; and
at least one line card coupled with the at least one control card, the at least one line card operable to transmit the complete set of the LSPs to the network.

7. The transmitter network element of claim 6, wherein the complete set specification module comprises:
an identifier generator module operable to generate an identifier for the complete set of the LSPs;
an identifier insertion module operable to have the identifier included in each of the CS-TLVs of the complete set;
a link state message counter operable to count a total number of the LSPs of the complete set; and
a total number insertion module operable to have the total number included in at least one of the CS-TLVs.

8. The transmitter network element of claim 7, wherein a CS-TLV is to include a first field to specify a type of the information element, a second field to include the identifier, and a third field to specify a length of the second field.

9. The transmitter network element of claim 6, wherein the link state routing protocol module comprises an Intermediate System to Intermediate System (IS-IS) link state routing protocol module.

10. A method, performed by a receiver network element utilizing a link state routing protocol which has a maximum link state message size, of avoiding a disruption in data forwarding that would result from the receiver network element performing preferred route computations based on an incomplete set of link state messages, the method comprising the steps of:
receiving a complete set of link state messages having information indicating that the link state messages are the complete set of the link state messages, wherein the complete set of the link state messages are collectively coherent with a link state of a transmitter network element, wherein the information indicating that the link state messages are the complete set of the link state messages is included in complete set type-length-value (CS-TLV) elements that do not have link state information;
determining that the received complete set of the link state messages are the complete set of the link state messages by using the received information; and
delaying performing preferred route computations until after said determining that the received complete set of the link state messages are the complete set of the link state messages.

11. The method of claim 10, wherein the step of determining that the received complete set of the link state messages are the complete set of the link state messages by using the received information comprises the steps of:
recognizing an identifier, for the complete set of the link state messages, in each of the link state messages of the complete set;
maintaining a count of the link state messages in which the identifier is recognized;
recognizing a total number of the link state messages of the complete set in at least one of the link state messages of the complete set; and
determining that the count equals the total number.

12. The method of claim 11, wherein the step of recognizing the identifier in each of the link state messages comprises recognizing the identifier in an information element in a link state message, and wherein the information element includes a first field specifying a type of the information element, a second field including the identifier, and a third field specifying a length of the second field.

13. The method of claim 10, further comprising a step of initiating said performing the preferred route computations in response to said determining that the received complete set of the link state messages are the complete set of the link state messages.

14. The method of claim 10, wherein the method is performed by the receiver network element utilizing an Intermediate System to Intermediate System (IS-IS) link state routing protocol.

15. The method of claim 10, wherein the step of receiving the complete set of the link state messages having the information indicating that the link state messages are the complete set comprises receiving a complete set of link state protocol data units (LSPs) each having a type-length-value (TLV) element having the information indicating that the LSPs are the complete set.

16. The method of claim 10, wherein the complete set of the link state messages is a subset of link state messages generated by the transmitter network element that includes all type-length-value (TLV) elements from a single previously sent link state message.

17. A receiver network element, the receiver network element operable to be deployed in a network and coupled with a transmitter network element by a link, the receiver network element operable to avoid a disruption in data forwarding that would result from the receiver network element performing preferred route computations based on an incomplete set of link state messages, the receiver network element comprising:
- at least one line card operable to receive a complete set of link state messages, and information to indicate that the link state messages are the complete set of the link state messages from the network, wherein the complete set of the link state messages are collectively coherent with a link state of the transmitter network element, and wherein the information to indicate that the link state messages are the complete set of the link state messages is included in complete set type-length-value (CS-TLV) elements that do not have link state information;
- at least one control card coupled with the at least one line card;
- a link state routing protocol module of the at least one control card, the link state routing protocol module operable to use the link state routing protocol that has a maximum link state message size;
- a complete set determination module of the at least one control card, the complete set determination module operable to determine that the received complete set of the link state messages are the complete set of the link state messages by using the received information; and
- a preferred route computations scheduler module of the at least one control card, the preferred route computations scheduler module operable to communicate with the complete set determination module, the preferred route computations scheduler module operable to delay scheduling of preferred route computations until after the complete set determination module determines that the received complete set of the link state messages are the complete set of the link state messages.

18. The receiver network element of claim 17, wherein the complete set determination module comprises:
- an identifier recognition module that is operable to recognize an identifier, for the complete set of the link state messages, in each of the link state messages of the complete set;
- a link state message counter that is operable to maintain a count of the link state messages in which the identifier is recognized;
- an total number recognition module that is operable to recognize a total number of the link state messages of the complete set in at least one of the link state messages of the complete set; and
- a comparator module that is operable to compare the count with the total number.

19. The receiver network element of claim 18, wherein the identifier recognition module is operable to recognize the identifier in an information element in a link state message, and wherein the information element is to include a first field to specify a type of the information element, a second field to include the identifier, and a third field to specify a length of the second field.

20. The receiver network element of claim 17, wherein the preferred route computations scheduler module further comprises an initiator module that is operable to initiate the preferred route computations responsive to the complete set determination module determining that the received complete set of the link state messages are the complete set.

21. The receiver network element of claim 17, wherein the complete set of the link state messages is a subset of link state messages generated by the transmitter network element that includes all type-length-value (TLV) elements from a single previously sent link state message.

* * * * *

UNITED STATES PATENT AND TRADEMARK OFFICE
CERTIFICATE OF CORRECTION

PATENT NO. : 8,830,867 B2  
APPLICATION NO. : 13/277100  
DATED : September 9, 2014  
INVENTOR(S) : Lu et al.

Page 1 of 1

It is certified that error appears in the above-identified patent and that said Letters Patent is hereby corrected as shown below:

On the Title Page, Item (74), under "Attorney, Agent, or Firm", in Column 1, Line 2, delete "Zafman" and insert -- Zafman LLP --, therefor.

Signed and Sealed this  
Twenty-eighth Day of April, 2015

Michelle K. Lee  
*Director of the United States Patent and Trademark Office*